US011652008B2

(12) United States Patent
Oron et al.

(10) Patent No.: US 11,652,008 B2
(45) Date of Patent: May 16, 2023

(54) ADAPTIVE ROUTING FOR CORRECTING DIE PLACEMENT ERRORS

(71) Applicant: Orbotech Ltd., Yavne (IL)

(72) Inventors: Ram Oron, Nes Ziona (IL); Michael Burdinov, Beer Sheva (IL); Elad Goshen, Beer Sheva (IL); Ronald F. Kaminsky, Kfar Safa (IL); Gonen Raveh, Moshav Timorim (IL)

(73) Assignee: Orbotech Ltd., Yavne (IL)

( * ) Notice: Subject to any disclaimer, the term of this patent is extended or adjusted under 35 U.S.C. 154(b) by 0 days.

(21) Appl. No.: 17/288,369

(22) PCT Filed: Oct. 2, 2019

(86) PCT No.: PCT/IL2019/051074
§ 371 (c)(1),
(2) Date: Apr. 23, 2021

(87) PCT Pub. No.: WO2020/084607
PCT Pub. Date: Apr. 30, 2020

(65) Prior Publication Data
US 2022/0012405 A1 Jan. 13, 2022

Related U.S. Application Data

(60) Provisional application No. 62/749,131, filed on Oct. 23, 2018.

(51) Int. Cl.
*G06F 30/3953* (2020.01)
*G06F 30/398* (2020.01)
(Continued)

(52) U.S. Cl.
CPC .......... *G06F 30/3953* (2020.01); *G06F 30/31* (2020.01); *G06F 30/398* (2020.01); *G06F 2115/12* (2020.01)

(58) Field of Classification Search
CPC .................................................. G06F 30/3953
(Continued)

(56) References Cited

U.S. PATENT DOCUMENTS 6,709,962 B2   3/2004   Berg
7,121,839 B2   10/2006  Rathburn
(Continued)

FOREIGN PATENT DOCUMENTS

EP      2367200      9/2011

OTHER PUBLICATIONS

WIPO, ISR for PCT/IL2019/051074, Feb. 3, 2020.
(Continued)

*Primary Examiner* — Eric D Lee
(74) *Attorney, Agent, or Firm* — Hodgson Russ LLP (57) ABSTRACT

A method includes, receiving a layout design of at least part of an electronic module, the design specifying at least (i) an electronic device coupled to at least a substrate, and (ii) an electrical trace that is connected to the electronic device and has a designed route. A digital input, which represents at least part of an actual electronic module that was manufactured in accordance with the layout design but without at least a portion of the electrical trace, is received. An error in coupling the electronic device to the substrate, relative to the layout design, is estimated based on the digital input. An actual route that corrects the estimated error, is calculated for at least the portion of the electrical trace. At least the portion of the electrical trace is formed on the substrate of the actual electronic module, along the actual route instead of the designed route.

20 Claims, 5 Drawing Sheets

(51) Int. Cl.
*G06F 30/31* (2020.01)
*G06F 115/12* (2020.01)

(58) Field of Classification Search
USPC .......................................................... 716/126
See application file for complete search history.

(56) References Cited

U.S. PATENT DOCUMENTS

| | | |
|---|---|---|
| 7,127,812 B2 | 10/2006 | Hiramatsu et al. |
| 7,283,660 B2 | 10/2007 | Ganot et al. |
| 7,372,616 B2 | 5/2008 | Bang et al. |
| 7,383,632 B2 | 6/2008 | Dittmann |
| 7,508,515 B2 | 3/2009 | Hanina et al. |
| 8,769,471 B2 | 7/2014 | Noy |
| 8,799,745 B2 | 8/2014 | Koseki |
| 8,799,845 B2 | 8/2014 | Scanlan et al. |
| 8,898,606 B1 | 11/2014 | Abou Ghaida et al. |
| 9,040,316 B1 | 5/2015 | Scanlan et al. |
| 2003/0124868 A1 | 7/2003 | Mizukoshi |
| 2005/0068054 A1 | 3/2005 | Mok et al. |
| 2007/0249067 A1 | 10/2007 | Hedler et al. |
| 2008/0113302 A1 | 5/2008 | Takashima et al. |
| 2013/0280826 A1* | 10/2013 | Scanlan ............... H01L 24/03 438/15 |
| 2014/0310671 A1 | 10/2014 | Beer et al. |
| 2015/0364444 A1 | 12/2015 | Scanlan et al. |
| 2016/0210393 A1 | 7/2016 | Chavhan et al. |
| 2016/0329257 A1 | 11/2016 | Scanlan et al. |
| 2017/0185711 A1 | 6/2017 | Fujiwara |

OTHER PUBLICATIONS

EPO, Extended European Search Report and Opinion for EP Application No. 19877125.5, dated May 24, 2022.
TIPO, Office Action for TW Application No. 108134348, dated Nov. 22, 2022 (see designations on p. 7).

* cited by examiner

ADAPTIVE ROUTING FOR CORRECTING DIE PLACEMENT ERRORS

FIELD OF THE INVENTION

The present invention relates generally to manufacturing of electronic modules, and particularly to methods and systems for adaptively routing interconnections of electronic devices on a substrate of an electronic module.

BACKGROUND OF THE INVENTION

Electronic modules and systems typically comprise one or more electronic devices electrically connected to a substrate using electrical interconnects. Various techniques of patterning the electrical interconnects are known in the art.

For example, U.S. Pat. No. 7,508,515 describes a system and method for fabricating an electrical circuit in which a digital control image is generated by non-uniformly modifying a representation of an electrical circuit, such that an electrical circuit pattern recorded on a substrate using the digital control image precisely fits an already formed electrical circuit portion.

U.S. Pat. No. 8,799,845 describes an adaptive patterning method and system for fabricating panel based package structures. Misalignment for individual device units in a panel or reticulated wafer may be adjusted for by measuring the position of each individual device unit and forming a unit-specific pattern over each of the respective device units.

U.S. Pat. No. 9,040,316 describes a semiconductor device and method of adaptive patterning for panelized packaging with dynamic via clipping. A panel comprising an encapsulating material disposed around a plurality of semiconductor dies is formed. An actual position for each of the plurality of semiconductor die within the panel is measured. A conductive redistribution layer (RDL) comprising first capture pads aligned with the actual positions of each of the plurality of semiconductor die is formed. A plurality of second capture pads at least partially disposed over the first capture pads and aligned with a package outline for each of the plurality of semiconductor packages is formed. A nominal footprint of a plurality of conductive vias is adjusted to account for a misalignment between each semiconductor die and its corresponding package outline.

SUMMARY OF THE INVENTION

An embodiment of the present invention that is described herein provides a method, including receiving a layout design of at least part of an electronic module, the design specifying at least (i) an electronic device coupled to at least a substrate, and (ii) an electrical trace that is connected to the electronic device and has a designed route. A digital input, which represents at least part of an actual electronic module that was manufactured in accordance with the layout design but without at least a portion of the electrical trace, is received. An error in coupling the electronic device to the substrate, relative to the layout design, is estimated based on the digital input. An actual route that corrects the estimated error, is calculated for at least the portion of the electrical trace. At least the portion of the electrical trace is formed on the substrate of the actual electronic module, along the actual route instead of the designed route.

In some embodiments, calculating the actual route includes defining for the actual electronic module (i) a first frame, which surrounds and keeps a first margin around the electronic device, and (ii) a second frame, which surrounds the first frame and keeps a second margin, larger than the first margin, around the electronic device. The actual route is calculated between the first and second frames. In other embodiments, defining the second frame includes setting the second margin based on the estimated error in coupling the electronic device to the substrate. In yet other embodiments, receiving the digital input includes receiving at least one input selected from a list consisting of: (a) an image of the actual electronic module laid out at least within the first and second frames, and (b) measurements of a width of at least the portion of the electrical trace laid out at least between the first and second frames.

In an embodiment, the method includes, based on the digital input, disqualifying the actual electronic module when at least part of the electronic device or the first frame exceeds the second frame. In another embodiment, estimating the error includes estimating one or more error types selected from a list consisting of (a) a shift of the electronic device from a first location specified in the layout design to a second location received in the digital input, (b) rotation of the electronic device in the digital input relative to the layout design, and (c) a scaling error between the electronic device and the substrate. In yet another embodiment, the designed route includes at least a point laid out at a first position on a first edge of the designed route, and calculating the actual route includes estimating, based on the digital input, a displacement of the point from the first position to a second different position, and based on the second position, calculating a first calculated edge on the actual route, such that the second position is laid out on the first calculated edge.

In some embodiments, calculating the actual route includes checking whether the actual route violates one or more design rules of the layout design, and adjusting the actual route to comply with the design rules. In other embodiments, forming the electrical trace includes producing the electrical trace along the actual route using a direct imaging system.

In an embodiment, the substrate includes a printed circuit board (PCB) and the electronic device includes an integrated circuit (IC) mounted on the PCB. In another embodiment, the electronic device is coupled to the substrate using an embedded die packaging process.

There is additionally provided, in accordance with an embodiment of the present invention, a system that includes a processor and a direct imaging subsystem. The processor is configured to: (a) receive a layout design of at least part of an electronic module, the design specifying at least (i) an electronic device coupled to at least a substrate, and (ii) an electrical trace that is connected to the electronic device and has a designed route, (b) receive a digital input, which represents at least part of an actual electronic module that was manufactured in accordance with the layout design but without at least a portion of the electrical trace, (c) estimate, based on the digital input, an error in coupling the electronic device to the substrate, relative to the layout design, and (d) calculate, for at least the portion of the electrical trace, an actual route that corrects the estimated error. The direct imaging subsystem is configured to form, based on the actual route, at least the portion of the electrical trace on the substrate of the actual electronic module, along the actual route instead of the designed route.

The present invention will be more fully understood from the following detailed description of the embodiments thereof, taken together with the drawings in which:

DETAILED DESCRIPTION OF EMBODIMENTS

Overview

Producing an electronic module typically comprises coupling at least one electronic device to a substrate, for example by picking the electronic device as a die from a diced wafer and placing the die on the substrate. The electronic device typically connects to other components on the substrate using electrical traces.

In some cases, an error occurs in placing the die, which may cause misalignment between the electronic device and the electrical traces on the substrate, resulting in poor functionality or disqualification of the electronic module.

Embodiments of the present invention that are described hereinbelow provide systems and methods for estimating and correcting placement errors of the electronic device by adaptively routing the electrical traces on the substrate.

In some embodiments, the system comprises a processor, which is configured to receive a layout design of at least part of the electronic module. The received layout design comprises at least the electronic device coupled to the substrate, and electrical traces that are connected to the electronic device and have a designed route.

In some embodiments, the processor further receives a digital input, such as an image and measurements, of at least part of an actual electronic module that was manufactured in accordance with the layout design, but without at least a section of one or more of the electrical traces. In some embodiments, the processor is configured to estimate, based on the digital input, an error in a position of the electronic device on the substrate, relative to the layout design. The processor is further configured to calculate, for at least the section of the one or more of electrical traces, an actual route that corrects the estimated error.

In some embodiments, based on the layout design and a specified error, the processor is configured to calculate inner and outer frames surrounding the electronic device. The inner frame surrounding, e.g., coaxially, the electronic device at a predefined margin, and the outer frame surrounding the inner frame and having margins equal to or larger than the specified error. The margin between the inner and outer frames is also referred to herein as a "correction zone."

In some embodiments, the processor is configured to select, along a given edge of the designed route of the section, one or more points. For each selected point, the processor is configured to find along an opposite edge of the section facing the given edge, a point located at a minimal distance, referred to herein as a designed width, from the selected point.

In some embodiments, based on the digital input, the processor is configured to calculate, within the correction zone, a calculated route of the section by transforming at least the selected points of the designed route to comply with the digital input. The processor further calculates a width, for each of the selected points, by finding a corresponding point located at the opposite edge of the section, at a minimal distance from the respective selected point.

In some embodiments, the processor is configured to check whether the calculated route complies with design rules of the section, e.g., by comparing, at one or more of the selected points, between the corresponding designed and calculated widths, and when required, to calculate an actual route by adjusting the calculated route to comply with the design rules.

In some embodiments, the system further comprises a direct imaging subsystem, which is configured to produce, based on the actual route, at least the section of the electrical traces on the substrate of the actual electronic module, along the actual route instead of the designed route.

The disclosed techniques improve the quality of electronic modules integrated, for example, in a PCB or in embedded die packaging, by adjusting the routing between the device and substrate so as to compensate for variations in pick and placement processes of the electronic modules. Furthermore, the disclosed techniques improve the production efficiency of such electronic modules by improving the production yield and by enabling higher density of electronic modules produced on a given real estate of a substrate.

System Description

Figure 1:
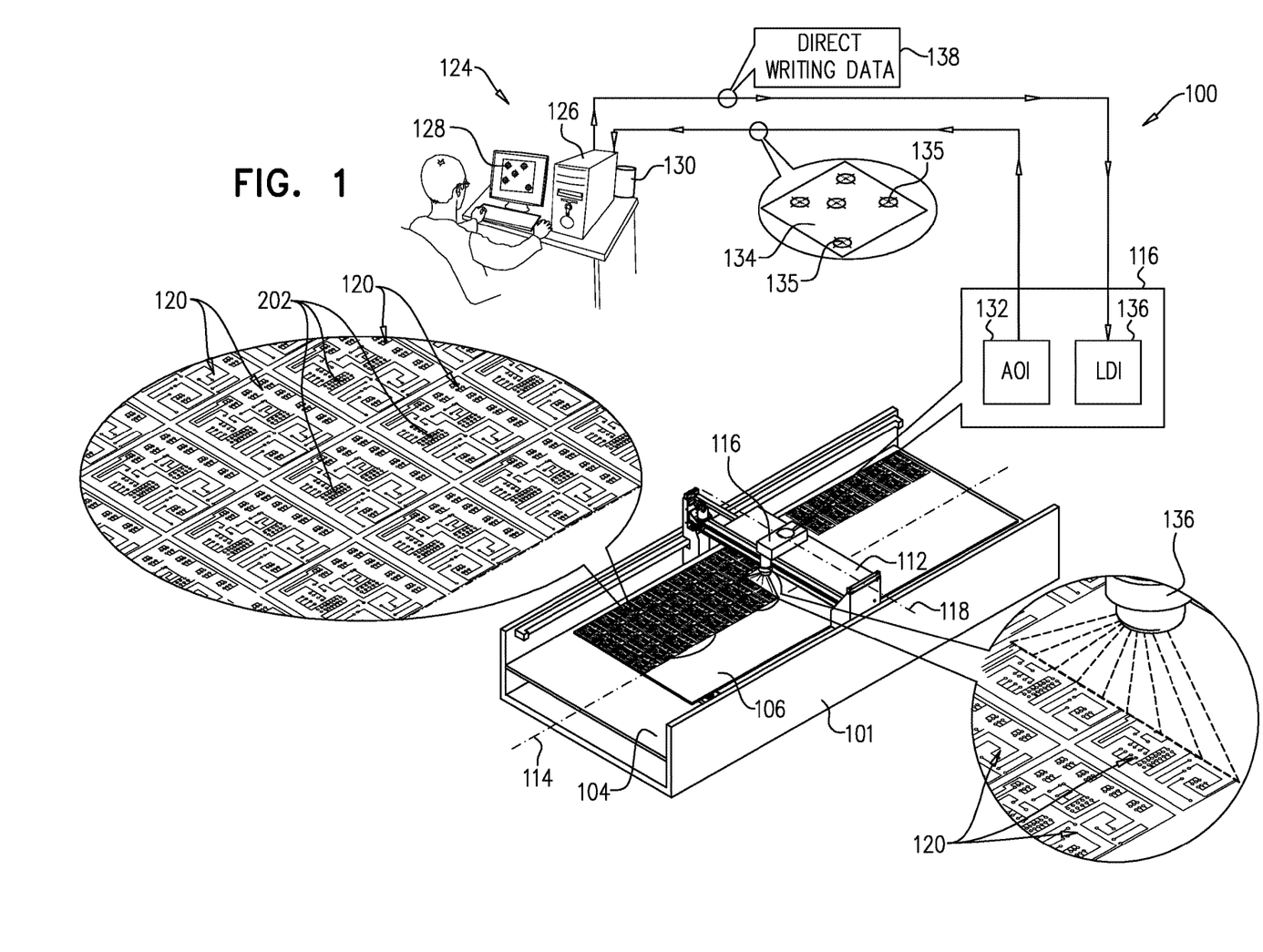
FIG. 1 is a schematic, pictorial illustration of a direct imaging (DI) system for printing conductors on a substrate, in accordance with an embodiment of the present invention.

FIG. 1 is a schematic, pictorial illustration of a direct imaging (DI) system 100 for printing a pattern on a substrate 106, in accordance with an embodiment of the present invention.

In some embodiments, system 100 comprises a chassis 101, which is mounted on an optical supporting table (not shown). Chassis 101 comprises a substrate support surface 104 configured to hold substrate 106 so as to print the pattern thereon by system 100. In some embodiments, substrate 106 may comprise any substrate suitable for computerized direct writing to be performed thereon and the patterning typically defines objects on one or more surfaces of substrate 106 by exposing photoresist overlying the respective surfaces to laser light. In other embodiments, the patterning may define objects on one or more surfaces of substrate 106 by exposing any other suitable photo-sensitive material overlying the respective surfaces to laser light. In some embodiments, system 100 is configured to apply a direct writing process to the substrate so as print thereon a design of multiple objects.

In the context of the present invention, the term object refers to features of any unit, such as an electronic module, which may be patterned by computerized direct writing onto substrate 106, each unit is typically spaced apart from other neighboring units located on substrate 106. In some embodiments, system 100 is configured to process various types of modules, such as but not limited to electronic circuitry configured to electrically connect with one or more devices mounted on a printed circuit board (PCB), and one or more devices, such as integrated circuit (IC) devices, packaged as embedded dies in any suitable substrate. The embedded die packages may comprise, for example, fan-in and/or fan-out packages of various types of devices, such as processors, controllers, memory devices, various types of one or more sensors and various types of one or more light sources.

In some embodiments, substrate 106 may comprise a panel comprising at least one of a woven fiberglass, polyimide, epoxy compound or any other type of rigid or flexible polymer, or a wafer made from semiconductor materials (e.g., silicone, silicone-germanium, or compound semiconductor), glass, plastic mold or any other suitable material. Furthermore, substrate 106 may be a flexible substrate bonded to a rigid support layer such as glass during production and subsequently removed therefrom after concluding the production process.

In some embodiments, system 100 comprises a bridge 112 arranged for linear motion relative to substrate support surface 104 along an axis parallel to a first axis 114, defined with respect to chassis 101. In other embodiments (not shown) the bridge may be static and the support surface along with the substrate placed on it, is configured to move, or both bridge and support surface move relative to one another.

In some embodiments, system 100 comprises at least one read/write assembly mounted along bridge 112. In the example of FIG. 1, a single read/write assembly 116 is arranged for selectable positioning relative to bridge 112 along a second axis 118, orthogonal to first axis 114. This configuration enables multiple sequential parallel scans to be carried out over substrate 106, each scan producing a plurality of objects 120.

In other embodiments, system 100 may comprise a plurality of read/write assemblies 116 that may be arranged in a side-by-side configuration on bridge 112 along second axis 118. This configuration enables multiple scans to be carried out simultaneously or partially simultaneously by respective assemblies 116 over substrate 106, each scan producing a plurality of objects 120.

In some embodiments, objects 120 are typically but not necessarily similar to one another and may be arranged one after the other in a direction parallel to first axis 114 and side-by-side parallel to second axis 118, as illustrated in FIG. 1. Alternatively, objects 120 may be arranged in any other suitable pattern, such as in a non-linear repeating or non-repeating pattern. In some embodiments, electronic module 200 comprises a device 202, such as an integrated circuit (IC), or a memory device or any other suitable electronic device.

In some embodiments, system 100 comprises an operating console, also referred to herein as a control assembly 124, which comprises a computer 126 comprising various devices, such as one or more processors and one or more memory devices (not shown) and a user interface 128. Computer 126 further comprises software modules configured to control the operation of read/write assembly 116, bridge 112 and other components of system 100.

In the context of the present invention, and in the claims, the term "the processor of computer 126" is referred to below simply as "the processor" for brevity.

In some embodiments, control assembly 124 further comprises a writing instruction database 130 comprising computer aided design (CAD) instructions used, in accordance with an embodiment of the present invention, for writing objects 120, on at least one surface of substrate 106.

In some embodiments, at least one read/write assembly 116 comprises an automated optical imaging (AO') subsystem 132 configured to acquire optical images 134 of substrate 106 received by the processor of computer 126. Such optical images 134 may comprise optical images of one or more suitable features (e.g., having a unique shape) of objects 120, and/or any suitable fiducials 135 on substrate 106, typically used for registration and/or calibration of system 100. In some embodiments, AOI subsystem 132 is further configured to measure various dimensions of features of the electronic module as well as distances, e.g., between neighbor features.

In some embodiments, read/write assembly 116 further comprises a direct imaging subsystem such as a laser direct imaging (LDI) subsystem 136 comprising an optical scanning assembly configured to enable laser writing onto substrate 106 for producing objects 120 in response to direct writing data 138 received from the processor of computer 126. Note that although both AOI subsystem 132 and LDI subsystem 136 are referred to herein as types of imaging subsystems, the imaging performed by each of the subsystems is of a mutually differing nature. AOI subsystem 132 performs optical imaging of substrate 106 so as to acquire optical images thereof, at least for the purpose of measurements, inspection, registration and calibration of system 100 prior to performance of direct writing on substrate 106. In contrast, LDI subsystem 136 performs direct writing on substrate 106 by laser imaging of a pattern onto substrate 106. In the context of the present invention, and in the claims, the term "LDI subsystem" is referred to below simply as "LDI" or "DI" for brevity.

In some embodiments, LDI 136 may comprise a laser scanner of the type described in U.S. Pat. No. 8,531,751, assigned to the same assignee as the present invention. Other examples of direct imaging systems suitable for use with the present invention comprise a Direct Imaging System, model no. DW-3000, available from SCREEN Semiconductor of Tokyo, Japan and a Maskless Aligner System, model no. MLA150, available from HEIDELBERG Instruments of Heidelberg, Germany.

In an embodiment, AOI subsystem 132 is configured to serve as a registration testing subsystem for improving the direct imaging process of LDI subsystem 136.

In some embodiments, the processor of computer 126 is configured to receive from database 130 a computer-aided design (CAD) file comprising electrical circuit design data for direct writing on substrate 106, the CAD file comprising CAD data for multiple objects 120 to be produced on substrate 106.

In some embodiments, the processor of computer 126 is configured to control read/write assembly 116 to direct, based on the CAD data, one or more laser beams for direct writing data on the substrate 106 in multiple parallel scans. The multiple parallel scans may be performed sequentially by a single repositionable read/write assembly, as illustrated in FIG. 1, or may be performed simultaneously or partially simultaneously using a plurality of read/write assemblies.

In some embodiment, control assembly 124 that is also referred to as an automatic direct write machine configuration (ADWMC) unit, is configured to receive a CAD file containing electrical circuit design data for direct writing on at least one surface of substrate 106. Control assembly 124 is further configured to automatically configure the direct write machine comprising at least one read/write assembly 116 to direct write the direct writing data based on the CAD data on substrate 106 in multiple scans.

In an embodiment, the processor of computer 126 automatically configures the direct writing data for the multiplicity of objects 120 to be written in a side by side manner in each of the multiple scans so as to be within the scan width, so that no object is written in multiple scans, thereby obviating the need for stitching of direct writing data between adjacent scans.

In some embodiments, read/write assembly 116 is controlled by control assembly 124 to create multiple objects 120 on substrate 106, typically in multiple scan passes, wherein the seam of adjacent scan passes is not located within an object, thereby obviating the need for stitching direct writing data between adjacent scans. Note that the seam is arranged to be between objects 120 and not overlying within objects 120.

In some embodiments, multiple scan passes are typically required in order to scan a full width of substrate 106, due to an inherent limitation in the maximum scan length provided by LDI 136. Such multiple scan passes may either be carried out sequentially using a single repositionable scan head or at least partially simultaneously performed by a plurality of scans heads operating simultaneously. This limitation in the scan length is dictated, among other factors, by a critical ratio that must be maintained between the required size of the focused laser beam performing direct writing on the substrate surface and the scan length of the scanning lens of LDI 136.

In some embodiments, substrate 106 is not limited to being a single-layer substrate having only single-layer objects 120 patterned thereon. Rather, system 100 may be employed in an additive manner, so as to selectively modify a substrate layer by layer so as to create a three dimensional structure. Objects 120 may thus be formed of multiple layers, which multiple layers may be sequentially written over one another in registration by read/write assembly 116.

Typically, computer 126 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Figure 2A:
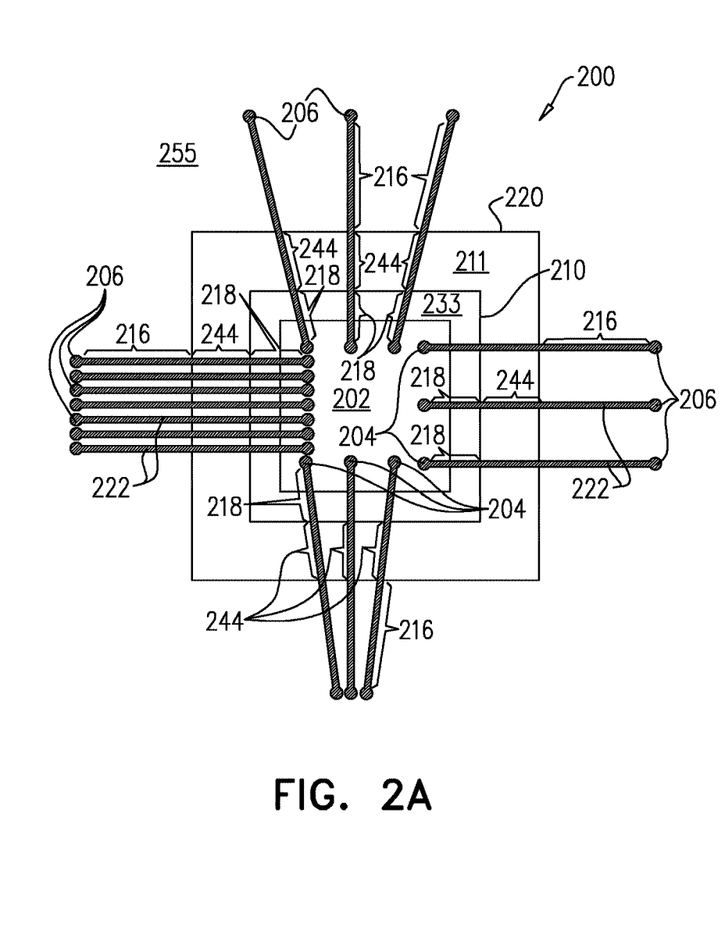
FIG. 2A is a schematic, pictorial illustration of a layout design of an electronic module, in accordance with an embodiment of the present invention.

FIG. 2A is a schematic, pictorial illustration of a layout design of an electronic module 200, in accordance with an embodiment of the present invention. Electronic module 200 may replace, for example, an electronic module of object 120 of FIG. 1 above. In some embodiments, electronic module 200 comprises device 202 depicted in FIG. 1 above.

In an embodiment, device 202 is coupled to a substrate 255 that may replace, for example, substrate 106 of FIG. 1 above. In this embodiment, device 202 and substrate 255 may be coupled to one another using any suitable configuration. For example, device 202 may be mounted on substrate 255 that comprises a PCB. In another example, device 202 may be embedded in substrate 255 using any suitable embedded die packaging technique, such as fan-in (e.g., in a semiconductor substrate) or fan-out (e.g., in a plastic mold substrate). In some embodiments, substrate 255 comprises electrical traces 222 that are connected to device 202, each electrical trace 222 has a designed route, e.g., between a pad 204 of device 202 and a connector 206, also referred to herein as a connecting pad, of substrate 255.

In some embodiments, the processor of computer 126 is configured to calculate, in electronic module 200, a frame 210 surrounding device 202 and having predefined margin from the edge of device 202, referred to herein a zone 233. Note that frame 210 follows the size, location and orientation of device 202. For example, in case device 202 is rotated at a given rotation angle relative to the designed layout, frame 210 is also rotated at the same angle.

The processor is further configured to calculate, in electronic module 200, a frame 220 surrounding frame 210 having another margin therebetween, referred to herein as a zone 211 or as a correction zone. A method for calculating the size of frame 220 and the width of zone 211 is depicted in detail in FIG. 2B below. Note that frames 210 and 220 are virtual frames laid out by the processor on the design of electronic module 200. In an embodiment, the correction zone between frames 210 and 220 is used for correcting placement errors of device 202 on substrate 255, as will be described in detail in FIG. 2B below.

In some embodiments, each trace 222 of electronic module 200 comprises three sections. An inner section, also referred to herein as a section 218, laid out between pad 204 and frame 210. An outer section, also referred to herein as a section 216, laid out between frame 22 and connector 206, and an intermediate section, also referred to herein as a section 244, laid out between frames 210 and 220 and connecting between sections 216 and 218.

Figure 2B:
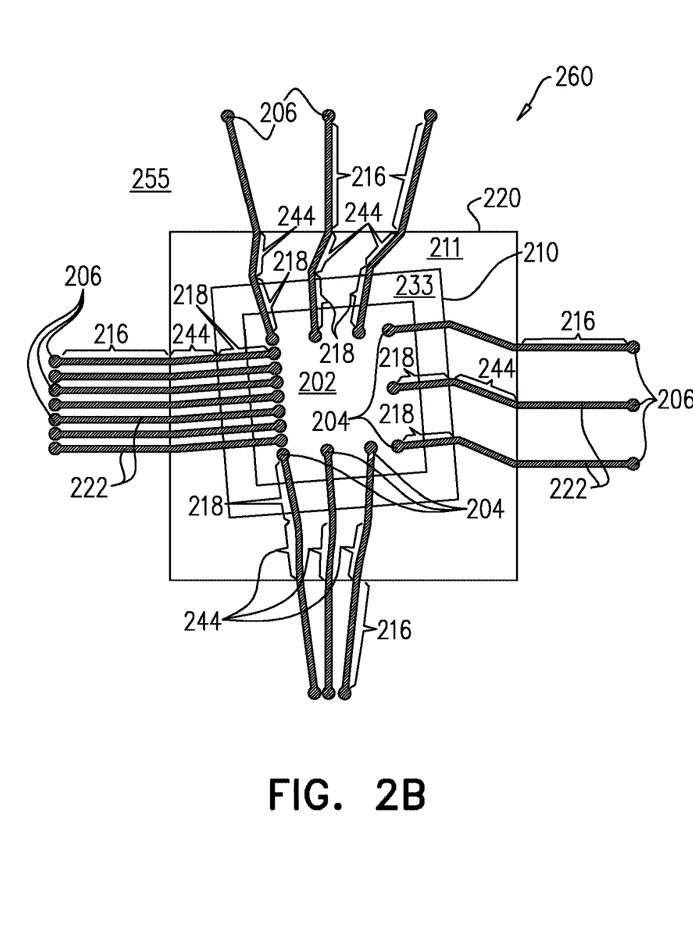
FIG. 2B is a schematic, pictorial illustration of a layout for correcting an error in coupling an electronic device to a substrate, in accordance with an embodiment of the present invention.

Estimating a Coupling Error of the Die to the Substrate and Calculating a Route that Corrects the Estimated Error FIG. 2B is a schematic, pictorial illustration of an electronic module 260, in accordance with an embodiment of the present invention. Module 260 may replace, for example, module 200 of FIG. 2A above. In the manufacturing process of module 260, device 202 is cut from a substrate (e.g., a silicon wafer) as a die, and is separated from neighbor dies using a tape or any other suitable technique.

Subsequently, a pick and placement system (not shown) picks up device 202 from the tape, and couples device 202 to a predefined position on substrate 255. The pick and placement system may have process variations that may result in errors in the coupling process of device 202 to substrate 255. For example, the pick and placement system may place device 202 on substrate 255 at an offset relative to the predefined position of the designed layout shown, for example, in FIG. 2A above. This offset error is also referred to herein as "translation" or "shift."

The coupling process may have other errors, such as a rotation error caused by undesired rotation of device 202 relative to the orientation specified in the designed layout shown, for example, in FIG. 2A above. Furthermore, thermal cycles in the manufacturing process may cause a different ratio between the size and/or area of device 202 and substrate 255 relative to the layout design shown in FIG. 2A above. For example, substrate 255 may comprise polymers having a coefficient of thermal expansion (CTE) larger than the CTE of device 202, which is typically made from silicone. This CTE difference may result, for example, in the different ratio described above, also referred to herein as a scaling error between device 202 and substrate 255.

As depicted in FIG. 1 above, the substrate may comprise multiple objects 120, thus multiple (e.g., more than a thousand) electronic modules 260, each comprising at least device 202. In the exemplary manufacturing process of electronic modules 260, more than a thousand devices 202 are coupled to substrate 255 and a suitable measurement system, such as a registration testing system or AOI subsystem 132, acquires images of multiple electronic modules 260 across substrate 255 (e.g., sampling five electronic modules).

In some embodiments, the processor is configured to extract from data base 130 only the area and locations of all frames 210 that are similar to all electronic modules 206 (rather than the entire area of the substrate) and to save this information in the memory of computer 126. In these embodiments, the processor reduces the loading on memory and communication resources of computer 126, which also enables improved speed and reliability in the operation of LDI subsystem 136.

In some embodiments, the processor is configured to receive from the registration testing system and/or from AOI subsystem 132 a digital input, such as a set of images and/or a set of measurements (e.g., size, orientation and registration between the designed and the actually produced features of electronic module 260) acquired from each of the sampled electronic module 260. Note that the digital input comprises at least part of the produced electronic module 260, also referred to herein as an actual electronic module 260, that was manufactured in accordance with the layout design shown, for example, in FIG. 2A above, but without at least a portion (e.g., section 244) of electrical traces 222.

In some embodiments, the processor is configured to estimate, based on the images and measurements of the digital input, an error in the coupling of device to substrate 255, relative to the layout design (e.g., shown in FIG. 2A above). Note that the estimated error typically comprises a combination of the shift, rotation and scaling errors described above.

In alternative embodiments, the estimated error may comprise only one of the aforementioned errors, or additional errors, or a combination of any two or more errors estimated based on the digital input received from the registration testing system or from any other imaging and/or measurement system.

In some embodiments, the processor is configured to set the width of zone 211 (i.e., the margin between frames 210 and 220) based on the maximal placement error of device 202 on substrate 255. The maximal error is typically a combination of the shift and rotation and scaling errors described above. In an embodiment, the processor applies a factor (e.g., five) to the maximal error for setting the width of zone 211. For example, for device 202 having a 1 mm size (e.g., length and width), the specified shift error is 30 µm, the specified rotation error is 10 milliradians (mrad) (resulting in up to 10 µm displacement due to rotation,) and the specified scaling error is 1% (resulting in an additional 10 µm error due to scaling error of at least one of device 202 and substrate 255.) In this example, the combined maximal error sums up to 50 µm, therefore, the selected width of zone 211 is set to 250 µm.

In other embodiments, the processor may apply any other suitable calculation for setting the width of zone 211. For example, the factor applied to the maximal error may be larger than one but smaller than five. An exemplary factor of 1.5 reduces the footprint of frame 220 by reducing the width of zone 211 from 250 µm to 75 µm. This factor allows incorporating a larger number of electronic modules 260 on substrate 255, but may reduce the production yield in case the total error exceeds the specified value of 50 µm, e.g., when the total error sums up to 80 µm. In this example, at least a portion of device 202 of a respective electronic module 260 may exceed the area of frame 220, and therefore, the processor of computer 126 will disqualify this respective electronic module 260.

In alternative embodiments, the processor may use only one error (e.g., shift error), or a combination of selected two of the aforementioned errors (e.g., shift and rotation errors), or another error of another measurement provided, for example, by AOI subsystem 132, or a combination thereof, or any other suitable method in the calculation of the width of zone 211.

Additionally or alternatively, in case the estimated error in a given electronic module exceeds the specified value, the processor may issue an alarm that disqualifies the respective given electronic module. In an embodiment, AOI subsystem 132 is further configured to detect a defect e.g., in a specific electronic module 260, such that, even though, in the specific electronic module, the estimated error described above is within the specification, the processor may disqualify the specific electronic module due to the defect.

In some embodiments, the processor is configured to calculate, for at least section 244 of electrical trace 222, an actual route that corrects the estimated error described above. As shown in FIG. 2B, sections 218 and 216 of trace 222 are retained, e.g., relative to pads 204 of device 202, as in the designed layout shown in FIG. 2A above, so that the actual route of section 244 compensates for the error by connecting between the ends of sections 218 and 216 located on frames 210 and 220, respectively.

Note that although sections 218 are retained at the same position and orientation relative to respective pads 204, in practice, pads 204 are displaced due to the error described above. In an embodiment, the processor is configured to calculate the actual route of each section 218 using the same method for calculating the actual route of section 244.

In other words, the actual route of section 218 differs from the designed route of section 218 so as to retain the designed position and orientation of each section 218 relative to the respective pad 204 that were displaced with the displacement of device 202. The actual route of section 244 differs from the designed route of section 244 so as to compensate for the relative displacement between the actual and the designed routes of section 218.

Subsequently, based on the calculated actual routes, LDI subsystem 136 prints all the sections (e.g., sections 216, 244 and 218) of trace 222 as described above.

The methods and layout of FIG. 2B are simplified for the sake of clarity and are shown by way of example, in order to illustrate certain problems that are addressed by embodiments of the present invention and to demonstrate the application of these embodiments in enhancing the performance of any DI system, such as a DI system 100.

Embodiments of the present invention, however, are by no means limited to this specific sort of example DI system and/or methods and/or layout, and the principles described herein may similarly be applied to any other sorts of systems methods and layouts.

In alternative embodiments, the processor may apply any other suitable method for correcting the estimated error in the coupling of device 202 to substrate 255. For example, using an inkjet system instead of DI system 100, or any other suitable type of additive manufacturing technique such as metal printers, or any CAM station rerouting solutions, or any other suitable method for correcting the estimated error in the coupling between device 202 and substrate 255.

Figure 3:
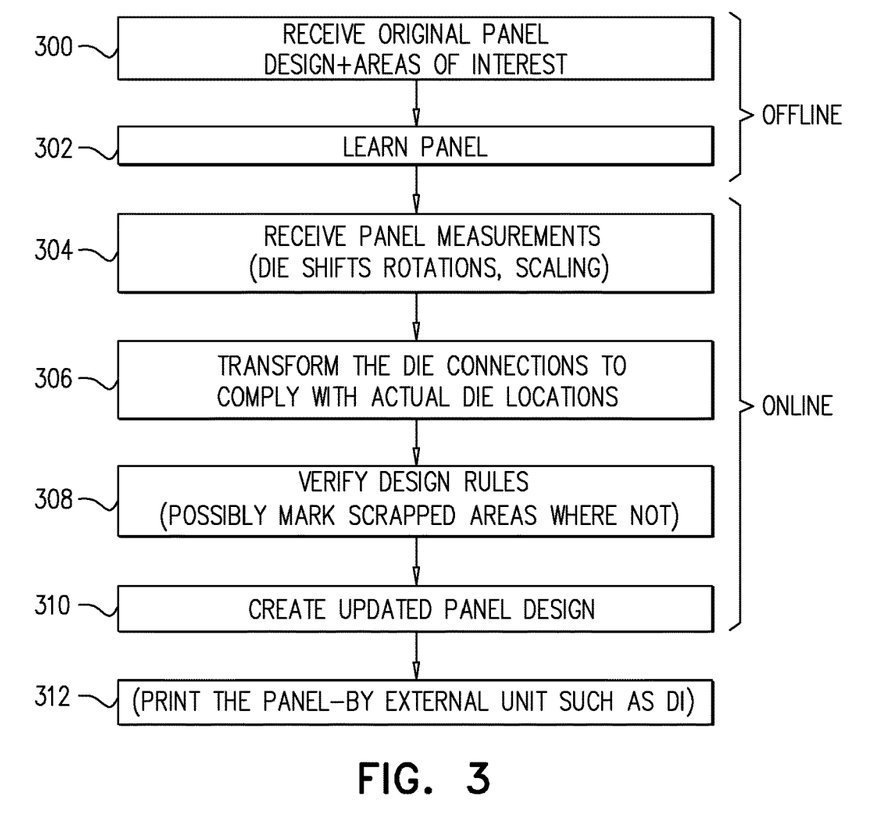
FIG. 3 is a flow chart that schematically illustrates a method for correcting an estimated error in coupling an electronic device to a substrate, in accordance with an embodiment of the present invention.

FIG. 3 is a flow chart that schematically illustrates a method for correcting an estimated error in coupling device 202 to substrate 255, in accordance with an embodiment of the present invention. The method begins with the processor receiving, e.g., from database 130, the design of a panel laid out on substrate 255, at a design receiving step 300. The processor is further configured to define, based on an input from a user of system 100 and/or based on one or more files of database 130, areas of interest and the respective size of each area of interest. For example, the user input may comprise the locations of each electronic module (e.g., electronic module 200), the size of device 202 and the specified errors of shift, rotation and scaling as described above.

At a panel learning step 302, also referred to herein as "an offline step" or "a preprocessing step," the processor determines in the design layout points of interest, for example, along trace 222, and sorts points in close proximity to each point of interest. In some embodiments, the processor is configured to calculate, based on the offline step, a designed width of trace 222 as will be described in detail in FIG. 5 below.

In principle, panel learning step 302 may be carried out at a later stage, e.g., after receiving the digital input, e.g., from the registration testing system, but the preprocessing of step 202 improves the speed and efficiency of system 100.

At a digital input receiving step 304, the processor receives from the registration testing system (or from any other suitable system, such as AOI subsystem 132) the digital input (e.g., images and/or measurements acquired at multiple locations across substrate 255) of at least part of the actual electronic module (e.g., electronic module 260) that was manufactured in accordance with the layout design shown in FIG. 2A above, but without at least section 244 of electrical trace 222. As described in FIG. 2B above, the processor is configured to estimate, based on the digital input, the combined error (e.g., of the shift, rotation and scaling) caused in the process of coupling device 202 to substrate 255, relative to the layout design (e.g., of electronic module 200). Note that steps 300 and 302 are considered offline steps, and all other operations carried out by the processor after receiving the digital input, are considered online steps. The offline and online steps are depicted in more detail in FIGS. 4-6 below.

At a transforming step 306, the processor transforms the preprocessed data (aforementioned at step 302) of section 244 and optionally of other elements of electronic module 206, so as to form a calculated route that complies with the digital input received at step 304. In other words, the processor transforms the designed pattern of features of interest of electrical traces 222 so as to comply with the actual position of device 202 relative to the designed layout of substrate 255. The calculated transformation is depicted in detail in FIG. 5 below.

At a verification step 308, the processor applies to the calculated route obtained at step 306 above, a set of design rules of the electronic module, e.g., minimal width of trace 222, minimal distance between adjacent features of the electronic module, allowed shape of features of interest and other design rule. In some embodiments, the processor may use a software for checking the design rules, and/or may interface with any suitable commercially-available design rule checking station (not shown).

In some embodiments, after applying the design rules, the processor may identify one or more electronic modules that violate (i.e., may not comply with) the design rules. In other words, in the respective electronic modules, the calculated route of section 244 will not be able to correct the error estimated at step 304, or the correction may fail to comply with the design rules. In these embodiments, the processor is configured to disqualify, also referred to herein as "scrap," these electronic modules so as to focus the utilization time of LDI subsystem 136 on the electronic modules that comply with the design rules.

In other embodiments, the processor is configured to mark these electronic modules for a corrective process step that may be carried out at a later stage of the process. The marking may be electronic, e.g., using a file with coordinates of the respective one or more electronic modules, and/or a physical marking, using any suitable technique. As noted above, the processor may calculate a new route of section 244, and/or another portion of electrical trace 222 and may send one or more instruction files to LDI subsystem 136 for correcting the calculated error in trace 222.

At an adjustment step 310, the processor adjusts the calculated route, based on the design rules, and calculates, for at least section 244 (and optionally for other elements of the electronic module) an actual route that corrects the estimated error and also complies with the design rules of the electronic module. In some embodiments, after obtaining the actual route, the processor sends to LDI subsystem 136 (or to any other suitable type of patterning system) one or more instruction files for applying the actual route to section 244 of trace 222, thereby terminating the online steps of the method.

In an example embodiment, based on the design rules at a given point, the designed width of electrical trace 222, along sections 216, 218 and 244, is 10 µm. After transforming step 306 the calculated width of at least one section 244 is 8 µm, resulting in an error of 2 µm, so that the processor has to increase the width of section 244. In this embodiment, the processor shifts each of the two edges of section 244 at the given point by half of the error (e.g., 1 µm) in a direction away from the center of section 244, thereby increasing the width of section 244 from 8 µm to 10 µm.

In another example embodiment, the calculated width of trace 222 at a given location is 14 µm, whereas the designed width of the trace at the given location is 10 µm, so that the processor has to reduce the width of the trace by 4 µm. In this embodiment, the processor shifts each of the two edges of trace 222 at the given location toward center by 2 µm.

In other embodiments, the processor may apply asymmetric adjustment between two edges so as to comply with other design rules, such as a minimal distance between two adjacent lines. In the example of section 244 having a calculated width of 8 µm (whereas the specified width in the design rule is 10 µm), the processor may shift, for example, one edge by 0.5 µm and the other edge by 1.5 µm away from the center of section 244 so as to compensate for the 2 µm difference between the calculated width and the design rules. In yet another embodiments, the processor may shift only one edge by 2 µm, whereas the other edge will not be moved.

In other embodiments, the processor is configured to apply any other suitable adjustments to lines, and/or to spaces between lines, and/or to trenches, and/or to other features and patterns of objects 120.

At a patterning step 312, LDI subsystem 136 executes the one or more instruction files so as to form, based on the actual route, at least section 244 on substrate 255. Note that LDI subsystem 136 prints section 244, along the actual route instead of the designed route so as to compensate for the placement error of device 202 and to comply with the design rules. Patterning step 312 concludes the method of FIG. 3.

Figure 4:
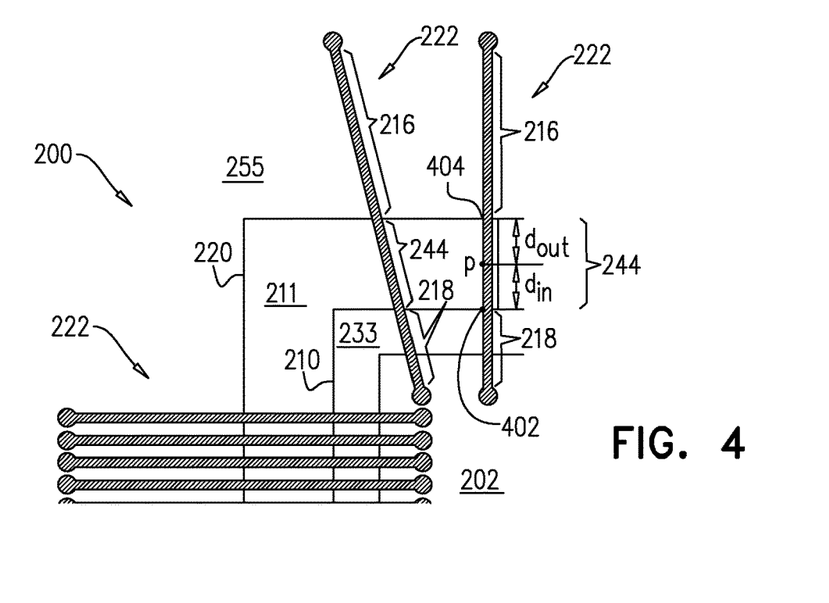
FIG. 4 is a schematic, pictorial illustration of a layout design of a section of an electronic module, in accordance with an embodiment of the present invention.

FIG. 4 is a schematic, pictorial illustration of a layout design of the intermediate section of electronic module 200, in accordance with an embodiment of the present invention. The layout design of FIG. 4 illustrates in detail the method described above for estimating the placement error of device 202 on substrate 255, relative to the layout design of electronic module 200.

In some embodiments, "p" represents a point laid out on an edge of trace 222. Point p is located in section 244, at a $d_{out}$ distance from frame 220 and at a $d_{in}$ distance from frame 210. In some embodiments, the processor calculates a parameter α that provides the proximity of point p to frames 210 and 220. The calculation of α is performed using an equation (1):

$$\alpha = \frac{din}{din + dOut} \quad (1)$$

The value of α has a range between zero and one. If point p is laid out at point 402, $d_{in}$ equals zero, thus parameter α equals zero. If point p is laid out at point 404, $d_{out}$ equals zero, thus parameter α equals one.

Figure 5:
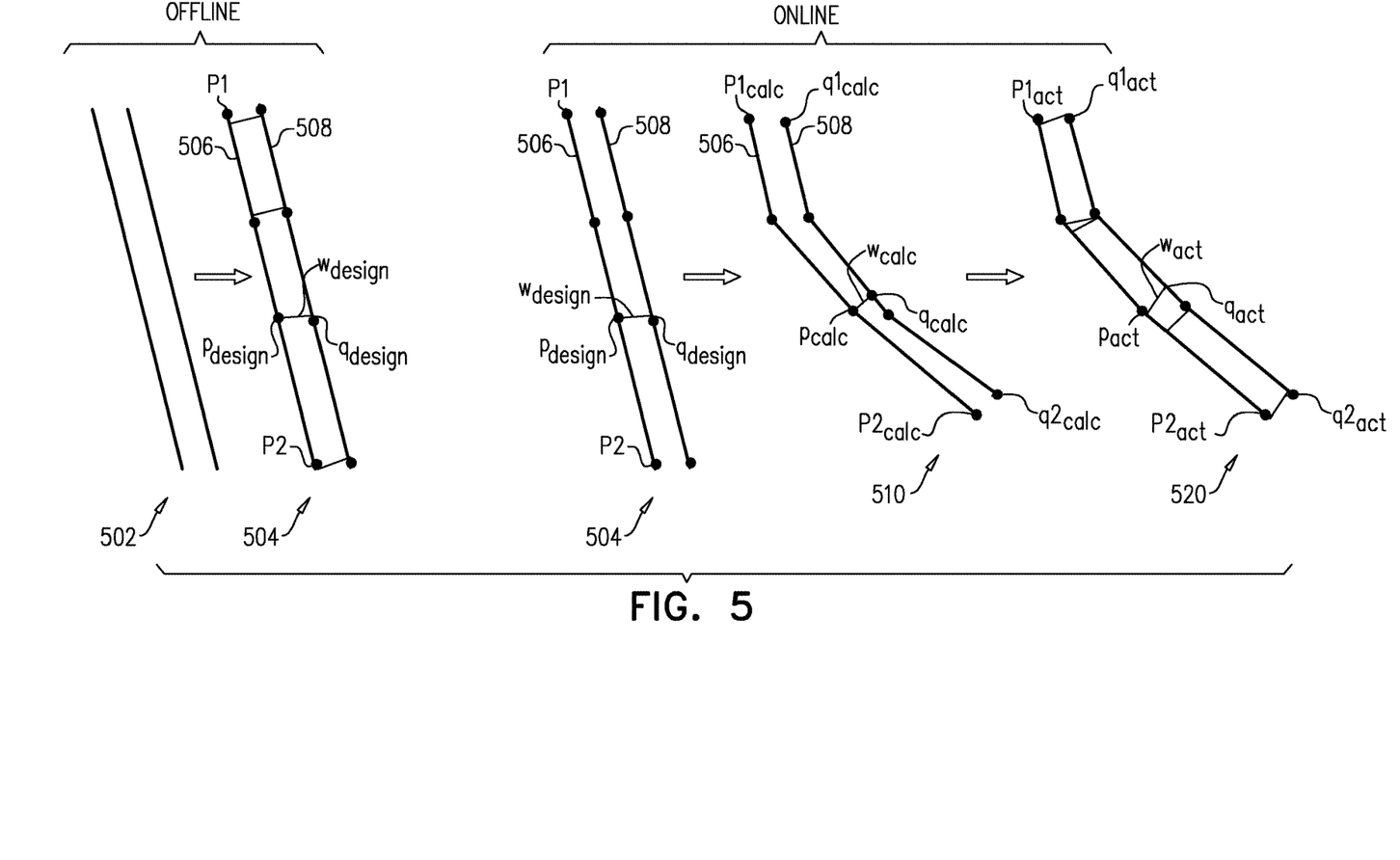
FIG. 5 is a schematic, pictorial illustration of a process sequence for calculating an actual route of an electrical trace that corrects an estimated error in coupling an electronic device to a substrate, in accordance with an embodiment of the present invention.

In some embodiments, the processor is configured to calculate the calculated route of section 244 (before applying the design rules) by transforming the position of points of interest, such as point p to a calculated position, referred to herein as "pcalc." The calculation of pcalc is carried out using an equation (2):

$$pcalc = \alpha * p + (1-\alpha) * T(p) \quad (2)$$

wherein T(p) is a transformation function, e.g., a transformation matrix. Note that equation (2) applies the transformation matrix based on the proximity of point p to frames 210 and 220. Accordingly, if α equals one, then pcalc equals p, which means no transformation of point p. In case α equals zero, then pcalc equals T(p), which means full transformation at point p. The transformation of points of interest, such as point p is shown schematically in FIG. 5 below. As shown in FIG. 2B, section 244 may have, for example, a linear shape disposed between the ends of sections 218 and 216 located on frames 210 and 220, respectively. Therefore, the position of pcalc depends on α, which represents the distances of point p from frames 210 and 220.

FIG. 5 is a schematic, pictorial illustration of a process sequence for calculating the actual route of section 244, in accordance with an embodiment of the present invention.

Reference is now made to the offline section of FIG. 5. In some embodiments, the processor receives from database 130 a designed route 502 of an intermediate section that may replace, for example, designed section 244 of FIG. 2A above laid out on substrate 255. As described at panel learning step 302, the processor identifies in the design layout points of interest, such as points pdesign, p1 and p2 shown on a preprocessed route 504, which is a preprocessed version of designed route 502.

In some embodiments, the processor further identifies a minimal distance, for example between point pdesign located on a left edge 506 of preprocessed route 504 and a closest point, referred to herein as qdesign located on a right edge 508 of preprocessed route 504, so as to calculate the designed width of preprocessed route 504, also referred to herein as "Wdesign" shown in preprocessed route 504.

Note that the offline step is carried out on a design of the electronic module, but is applicable for all the electronic modules having the same design and coupled to a respective substrate, e.g., substrate 255.

Reference is now made to the online section of FIG. 5. The online section comprises a copy of preprocessed route 504 calculated by the processor at the offline step. As described in step 304 of FIG. 3 above, the processor receives from the registration testing system the digital input of each actual electronic module (e.g., electronic module 260) that was manufactured in accordance with the layout design of electronic module 200, but without at least the intermediate section of the electrical trace.

Note that the following online steps are carried out for each electronic module due to different estimated error in coupling the device to the respective substrate.

In some embodiments, the processor is configured to estimate, based on the digital input, the combined error of the shift, rotation and scaling, caused in the process of placing device 202 on substrate 255, relative to the layout design. Based on the estimated error the processor calculates α and T(p) for each point p, and, based on calculated α and T(p), the processor transforms the preprocessed data of route 504 so as to form a calculated route 510 that complies with the received digital input.

In the example of FIG. 5, point p1calc may correspond to a point on the intermediate section that is in close proximity to an intersection between the end of section 216 and frame 220 of FIG. 2B above, and point p2calc may correspond to a point on the intermediate section that is in close proximity to an intersection between the end of section 218 and frame 210 of FIG. 2B above.

As shown in FIG. 2B, most of the error occurs at the edge of device 202, and, almost no error is observed close to the intersection between the end of section 216 and frame 220. Therefore, point p1calc is located in close proximity to point p1. In other words, the displacement distance in the transformation of point p1 to point p1calc is almost zero.

As shown in calculated route 510, point p2 is located on calculated route 510 in the closest proximity to device 202, therefore the transformation of point p2 to point p2calc comprises a substantial displacement. Similarly, in this example, the transformation of point pdesign to pcalc comprises a displacement larger than the transformation of point p1 to p1calc and smaller than the transformation of point p2 to p2calc.

In some embodiments, the processor receives from the transformation one or more polygons representing the pattern of the intermediate section, and searches along edge 508 of the respective polygon, a point qcalc, which is located at a minimal distance from point pcalc. The distance between points pcalc and qcalc is referred to herein as a calculated width, also referred to as Wcalc shown on calculated route 510.

The processor applies the same method to other points, such as points p1calc and p2calc, so as to produce respective points q1calc and q2calc, at respective minimal distances Wcalc1 and Wcalc2, thereby calculating the full pattern of calculated route 510. Note that at least two of the calculated widths (e.g., from among Wcalc, Wcalc1 and Wcalc2) may differ from one another.

In some embodiments, the processor applies to calculated route 510 a set of design rules of the electronic module, so as to verify compliance with the design rules, and if needed, to adjust the pattern of calculated route 510. In the example of FIG. 5, the processor checks whether the width of calculated route 510 complies with the specified width of the design rules. After learning the designed widths along route 504 and applying these widths to calculated route 510, the processor is configured to determine the direction of correction by using, for example, an equation (3):

$$dir = \frac{(pcalc - qcalc)}{|pcalc - qcalc|} \quad (3)$$

wherein "dir" is a unit vector showing, in a slope of a Cartesian coordinate system, the direction of correction from pcalc to the corresponding qcalc on edge 508.

In some embodiments, the processor is further configured to calculate the amount of correction using, for example, an equation (4):

$$X = \frac{Wdesign - |pcalc - qcalc|}{2} \quad (4)$$

wherein X is the calculated amount of correction along the vector "dir," and |pcalc−qcalc| represents the absolute value of the calculated width (shown in FIG. 5 as Wcalc).

Note that the difference between the designed width and the calculated width is divided by two because points on both edges, i.e., edges 506 and 508, are displaced in the calculation of X. In other embodiments, the processor may calculate X by moving only one point (e.g., by setting points on 506 as anchors and moving only points on 508, or the other way around.) In these embodiments, the division by two will be omitted from equation (4).

Subsequently, the processor applies equations (3) and (4) to multiple selected points along calculated route 510 (e.g., points p1calc and p2calc), and produces an actual route 520 by verifying or adjusting at least some point of calculated route 510.

In the example of FIG. 5, the processor sets actual locations, referred to herein as pact and qact, corresponding to pcalc and qcalc, respectively. The actual locations are set at an actual width, also referred to herein as Wact shown in actual route 520, wherein Wact complies with the design rules of the respective electronic module.

The processor also verifies or adjusts additional pairs of points, such as pair p1act and q1act, and pair p2act and q2act, so as to produce actual route 520.

The process sequence and methods described above are provided by way of example, and in alternative embodiments other suitable methods can also be used. For example, performing interpolations or extrapolations between pre-calculated exact solutions of specific shifts and rotations, or transforming the traces along deformed grids that are based on actual positions of dies, or performing optimization of trace path under design rules.

Figure 6:
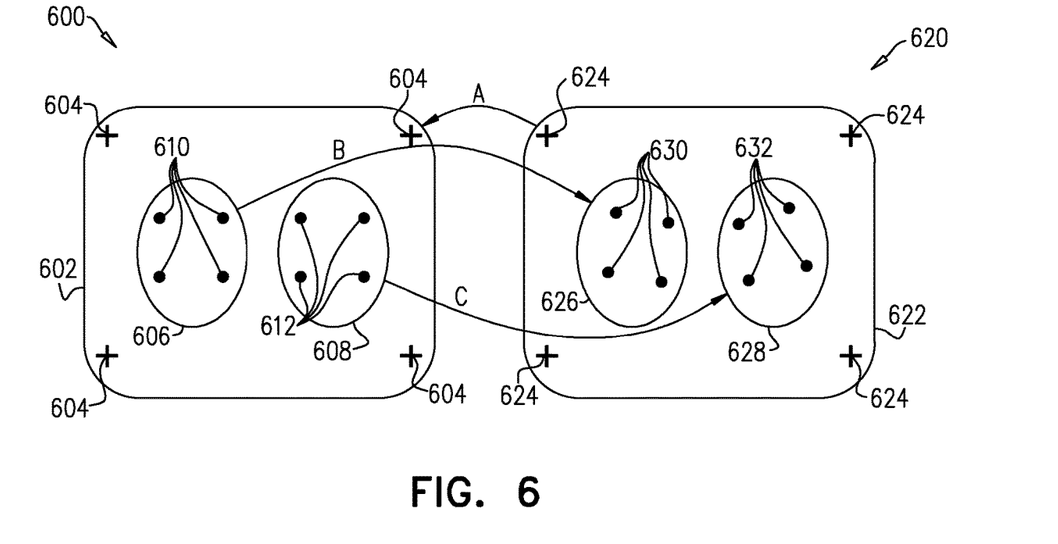
FIG. 6 is a schematic, pictorial illustration of a process sequence for producing transformation matrices between a layout design of given electronic modules and an image of actually produced components of the given electronic modules, in accordance with an embodiment of the present invention.

FIG. 6 is a schematic, pictorial illustration of a process sequence for producing transformation matrices between a layout design 600 of given electronic modules and an image 620 representing the digital input of actually produced components of the given electronic modules, in accordance with an embodiment of the present invention. In some embodiments, the process sequence described herein comprises a detailed description of part of the transformation step described in essence at step 306 of FIG. 3 above.

In some embodiments, the processor receives from database 130 layout design 600, which comprises a panel 602 having four registration marks 604, and two electronic modules 606 and 608 having, each, four registration marks 610 and 612, respectively. In other embodiments, panel 602 and each electronic module 606 and 608 may have any other suitable number of registration marks that may differ from one another. Moreover, electronic modules 606 and 608 may have different configurations from one another, e.g., different number and types of devices and/or different patterns of the electrical traces.

In other embodiments, layout design 600 may have a single electronic module comprising two dies, instead of electronic modules 606 and 608. The description below is applicable to these embodiments by replacing the term "electronic module" with the term "die."

In some embodiments, the processor receives from the registration testing system and/or from AOI subsystem 132, image 620 of the digital input, which comprises a panel 622 that corresponds to panel 602 of layout design 600. Panel 622 comprises four registration marks 624 corresponding to registration marks 604, and two electronic modules 626 and 628 having, each, four registration marks 630 and 632, respectively. Electronic modules 626 and 628 correspond respectively, to electronic modules 606 and 608, and registration marks 630 and 632 correspond respectively to registration marks 610 and 612 of layout design 600.

In some embodiments, the processor calculates, based on the aforementioned features of layout design 600 and image 620, the transformation matrix so as to produce the calculated route of the intermediate section and optionally of additional features of the respective electronic module.

In some embodiments, the processor applies an initial transformation matrix "B" to registration marks 610 by matching between registration marks 610 and 630 in a coordinate system of electronic module 606. Similarly, the processor applies an initial transformation matrix "C" to registration marks 612 by matching between registration marks 612 and 632 in a coordinate system of electronic module 608.

In some embodiments, the processor applies a transformation matrix "A" to registration marks 624 of panel 622 of image 620, by matching between the positions of registration marks 624 and registration marks 604 of panel 602 in a coordinate system of panel 622.

In some embodiments, the processor applies transformation matrix "A" to adjust initial transformation matrices "B" and "C", resulting in a composition of transformations "AB" for producing a transformation of points of interest of electronic module 606, and a composition of transformations "AC" for producing a transformation of points of interest of electronic module 608.

Figure 7:
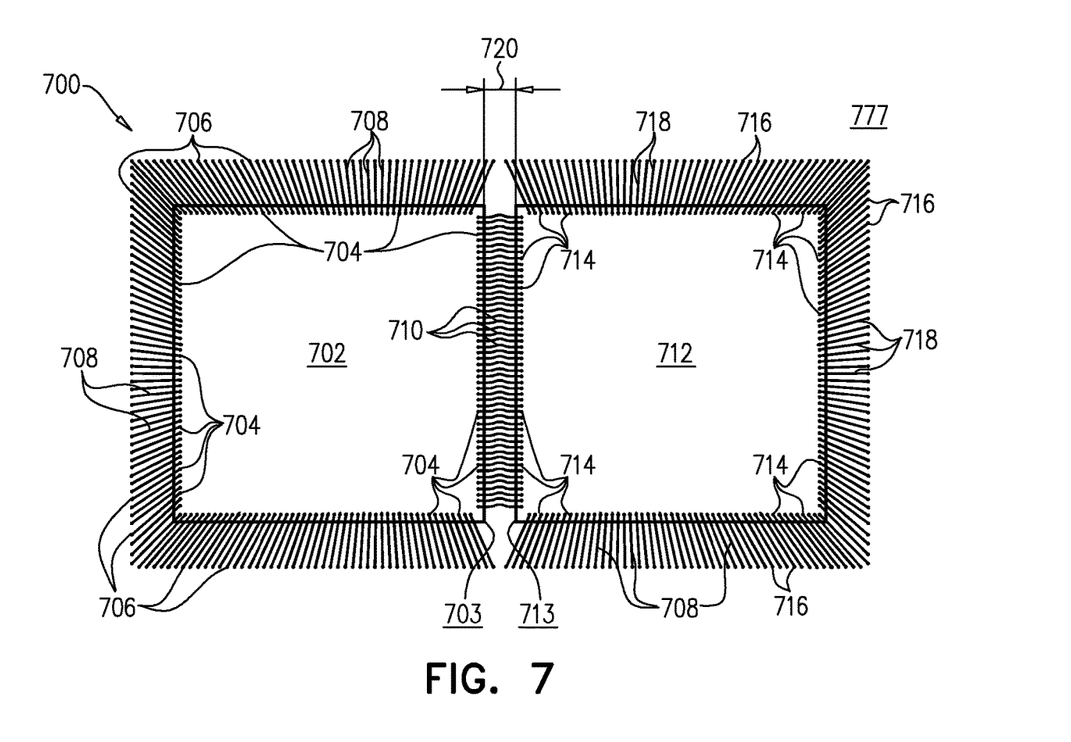
FIG. 7 is a schematic, pictorial illustration of a layout for correcting an error to electrically couple between two electronic devices via a substrate, in accordance with an embodiment of the present invention.

FIG. 7 is a schematic, pictorial illustration of a layout 700 for correcting an error to electrically couple between electronic devices 702 and 712 via a substrate 777, in accordance with an embodiment of the present invention. Substrate 777 may replace, for example, substrate 255 and each of devices 702 and 712 may replace, for example, device 202 of FIG. 2B above. Note that devices 702 and 712 may be similar or may differ from one another.

In some embodiments, layout 700 comprises a layout of at least part of an electronic module comprising two devices, rather than one as shown, for example, in FIG. 2A above.

In some embodiments, layout 700 comprises electrical traces 708 connecting between pads 704 of device 702 and connectors 706 of substrate 777. Similarly, electrical traces 718 are disposed between pads 714 of device 712 and connectors 716 of substrate 777. In some embodiments, layout 700 further comprises electrical traces 710 connecting between pads 704 of device 702 and pads 714 of device 712. Electrical traces 708, 710 and 718 are typically similar, but may alternatively differ from one another, e.g., in length, and/or width and/or composition of materials. For example, electrical traces 710 may differ from electrical traces 708.

As described, for example in FIG. 2B above, one or more pick and placement systems pick up devices 702 and 712 from one or more respective tapes, and couple devices 702 and 712 to predefined respective positions on substrate 777. The placement error of the coupling of devices 702 and 712 to substrate 777 is typically similar to the placement error described in the coupling of device 202 to substrate 255 in FIG. 2B. Yet, the close proximity between devices 702 and 712 may increase, e.g., double, the magnitude of the error to be corrected by the routing electrical traces 710.

In some embodiments, the processor typically applies the same methods described above so as to estimate the error and to calculate the actual route, but may apply different sets of allowed errors, for example to electrical traces 708 and to electrical traces 710.

In other embodiments, the processor may apply different sets of transformation matrices and/or design rules for calculating the actual routes, for example to electrical traces 708 and to electrical traces 710.

In alternative embodiments, the processor may calculate similar or alternative routes for electrically connecting at least some of pads 704 and 714 directly to one another, e.g., rather than via substrate 777. In these embodiments, the direct routing may be carried out using an LDI process carried out by LDI subsystem 136, or any suitable production process, such as wire bonding.

In the example of electrical traces 710, the processor may divide each electrical trace 710 into three sections, a first section between pad 704 and a physical edge 703 of device 702, a second section between pad 714 and a physical edge 713 of device 712, and a third section, also referred to as a zone 720, connecting between the first and second sections.

In some embodiments, and in accordance with the methodology described above, the processor may adjust the actual pattern of sections of electrical traces 710 between the pads (e.g., pads 704 and 714) and zone 720 so as to retain the designed route of these sections relative to the respective pads. The processor may calculate, within zone 720, an actual route that corrects the estimated error caused by the combined error in the placement of devices 702 and 712 relative to the layout design. Subsequently, the processor may send one or more execution files comprising at least the calculated actual route to LDI subsystem 136 so as to produce the actual route of electrical traces 710.

Note that in practice, the processor calculates the actual route for all the sections of each electrical trace 710. As described in FIG. 2B above, the processor calculates the actual route of the sections of trace 710 that connect between zone 720 and the pads (e.g., pads 704 and 714) so that the relative position and orientation of these sections relative to respective pads 704 and 714 is retained as in the design layout. In other words, pads 704 and 714 are displaced relative to the original design, therefore, the sections coupled to these pads are shifted accordingly so as to firmly connect with each of pads 704 and 714.

Although the embodiments described herein mainly address manufacturing of electronic modules based on PCB and/or embedded die processes, the methods and systems described herein can also be used in other applications, such as in displays or other electronic circuits.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
receiving a layout design of at least part of an electronic module, the design specifying at least (i) an electronic device coupled to at least a substrate, and (ii) an electrical trace that is connected to the electronic device and has a designed route;
receiving a digital input, which represents at least part of an actual electronic module that was manufactured in accordance with the layout design but without at least a portion of the electrical trace;
estimating, based on the digital input, an error in coupling the electronic device to the substrate, relative to the layout design;
calculating, for at least the portion of the electrical trace, an actual route that corrects the estimated error, wherein calculating the actual route comprises:
defining for the actual electronic module (i) a first frame, which surrounds and keeps a first margin around the electronic device, and (ii) a second frame, which surrounds the first frame and keeps a second margin, larger than the first margin, around the electronic device; and
calculating the actual route between the first and second frames; and
forming at least the portion of the electrical trace on the substrate of the actual electronic module, along the actual route instead of the designed route.

2. The method according to claim 1, wherein defining the second frame comprises setting the second margin based on the estimated error in coupling the electronic device to the substrate.

3. The method according to claim 1, wherein receiving the digital input comprises receiving at least one input selected from a list consisting of: (a) an image of the actual electronic module laid out at least within the first and second frames, and (b) measurements of a width of at least the portion of the electrical trace laid out at least between the first and second frames.

4. The method according to claim 1, and comprising, based on the digital input, disqualifying the actual electronic module when at least part of the electronic device or the first frame exceeds the second frame.

5. The method according to claim 1, wherein estimating the error comprises estimating one or more error types selected from a list consisting of (a) a shift of the electronic device from a first location specified in the layout design to a second location received in the digital input, (b) rotation of the electronic device in the digital input relative to the layout design, and (c) a scaling error between the electronic device and the substrate.

6. The method according to claim 1, wherein the designed route comprises at least a point laid out at a first position on a first edge of the designed route, and wherein calculating the actual route comprises estimating, based on the digital input, a displacement of the point from the first position to a second different position, and based on the second position, calculating a first calculated edge on the actual route, such that the second position is laid out on the first calculated edge.

7. The method according to claim 6, wherein calculating the actual route comprises checking whether the actual route violates one or more design rules of the layout design, and adjusting the actual route to comply with the design rules.

8. The method according to claim 1, wherein forming the electrical trace comprises producing the electrical trace along the actual route using a direct imaging system.

9. The method according to claim 1, wherein the substrate comprises a printed circuit board (PCB) and the electronic device comprises an integrated circuit (IC) mounted on the PCB.

10. The method according to claim 1, wherein the electronic device is coupled to the substrate using an embedded die packaging process.

11. A system, comprising:
a processor, which is configured to:
receive a layout design of at least part of an electronic module, the design specifying at least (i) an electronic device coupled to at least a substrate, and (ii) an electrical trace that is connected to the electronic device and has a designed route;
receive a digital input, which represents at least part of an actual electronic module that was manufactured in accordance with the layout design but without at least a portion of the electrical trace;
estimate, based on the digital input, an error in coupling the electronic device to the substrate, relative to the layout design; and
calculate, for at least the portion of the electrical trace, an actual route that corrects the estimated error, wherein calculating the actual route includes:
defining for the actual electronic module (i) a first frame, which surrounds and keeps a first margin around the electronic device, and (ii) a second frame, which surrounds the first frame and keeps a second margin, larger than the first margin, around the electronic device; and
calculating the actual route between the first and second frames; and
a direct imaging subsystem, which is configured to form, based on the actual route, at least the portion of the electrical trace on the substrate of the actual electronic module, along the actual route instead of the designed route.

12. The system according to claim 11, wherein the processor is configured to set the second margin based on the estimated error in coupling the electronic device to the substrate.

13. The system according to claim 11, wherein the processor is configured to receive at least one input selected from a list consisting of: (a) an image of the actual electronic module laid out at least within the first and second frames, and (b) measurements of a width of at least the portion of the electrical trace laid out at least between the first and second frames.

14. The system according to claim 11, wherein, based on the digital input, the processor is configured to disqualify the actual electronic module when at least part of the electronic device or the first frame exceeds the second frame.

15. The system according to claim 11, wherein the processor is configured to estimate one or more error types selected from a list consisting of (a) a shift of the electronic device from a first location specified in the layout design to a second location received in the digital input, (b) rotation of the electronic device in the digital input relative to the layout design, and (c) a scaling error between the electronic device and the substrate.

16. The system according to claim 11, wherein the designed route comprises at least a point laid out at a first position on a first edge of the designed route, and wherein the processor is configured to estimate, based on the digital input, a displacement of the point from the first position to a second different position, and based on the second position, to calculate a first calculated edge on the actual route, such that the second position is laid out on the first calculated edge.

17. The system according to claim 16, wherein the processor is configured to check whether the actual route violates one or more design rules of the layout design, and to adjust the actual route to comply with the design rules.

18. The system according to claim 11, wherein the direct imaging subsystem is configured to print the electrical trace along the actual route.

19. The system according to claim 11, wherein the substrate comprises a printed circuit board (PCB) and the electronic device comprises an integrated circuit (IC) mounted on the PCB.

20. The system according to claim 11, wherein the electronic device is coupled to the substrate using an embedded die packaging process.

* * * * *